United States Patent [19]

Hajjar

[11] Patent Number: 5,719,838
[45] Date of Patent: Feb. 17, 1998

[54] β COMPENSATION USING A DEFOCUS TECHNIQUE

[75] Inventor: Roger A. Hajjar, Fairport, N.Y.

[73] Assignee: Eastman Kodak Company, Rochester, N.Y.

[21] Appl. No.: 625,604

[22] Filed: Mar. 29, 1996

[51] Int. Cl.$^6$ .................................................. G11B 27/36
[52] U.S. Cl. .................................................. 369/54
[58] Field of Search ........................... 369/54, 116, 58, 369/59, 44.27, 44.38, 44.26, 44.31

[56] References Cited

U.S. PATENT DOCUMENTS

| | | | |
|---|---|---|---|
| 5,005,164 | 4/1991 | Sakamoto et al. | 369/59 |
| 5,050,156 | 9/1991 | Barton | 369/54 |
| 5,136,569 | 8/1992 | Fennema et al. | 369/116 |
| 5,226,027 | 7/1993 | Bakx | 369/54 |
| 5,303,217 | 4/1994 | Bakx et al. | 369/48 |
| 5,305,296 | 4/1994 | Kono | 369/54 |
| 5,446,716 | 8/1995 | Eastman et al. | 369/54 |
| 5,495,466 | 2/1996 | Dohmeier et al. | 369/44.31 |

*Primary Examiner*—Thang V. Tran
*Attorney, Agent, or Firm*—James D. Leimbach

[57] ABSTRACT

A method and apparatus used in compensating for birefringence effects in measuring recording data quality on optical discs, β, in an optical disc reader/recorder comprising performing a power series of writes on the optical disc within the optical disc reader/recorder, wherein each member of the series has a merit parameter, β value, identified and placed in a table versus recording parameters; identifying at least one particular track having an ideal merit parameters as compared to a predetermined value; using defocused optics to read the series of writes contained within the at least one particular track to generate a rate of change for β vs. defocus setting for the particular track; determining a β compensation value for the rate of change; and applying the β compensation in conjunction with the table to select appropriate recording parameters.

7 Claims, 2 Drawing Sheets

○ NON-POLARIZATION LOW BIFRINGENCE
● POLARIZATION LOW BIREFRINGENCE
□ NON-POLARIZATION HIGH BIFRINGENCE
■ POLARIZATION HIGH BIREFRINGENCE

൴ COMPENSATION USING A DEFOCUS
TECHNIQUE

FIELD OF INVENTION

The invention relates generally to optical data recording. More particularly, the present invention relates to improved optical recording in which the optimum recording power variation in the power calibration area is compensated by using a figure of merit (Beta) and defocus.

BACKGROUND OF THE INVENTION

A commonly used technique for determining an initial optimal laser write power involves allocating a section of the CD-R for power calibration measurements. Several trial records are made in this section using a range of laser powers. The trial recordings are read back, and the write power level which produces the best recording quality is selected as optimal. A measure of recorded data quality is commonly referred to as Beta, or simply $\beta$, which is defined in the Orange Book attachment B3.4. This $\beta$ measures recorded mark length error by comparing positive and negative peaks of an AC-coupled readback waveform. When the marks have the proper length, the value of $\beta$ is zero. When the mark length is longer than the land length, due to, for example, an improper recording power, $\beta$ is positive. When the mark length is shorter, $\beta$ is negative. Given a target $\beta$, the Optimum Recording Power (ORP) is determined from the trial recordings and used to record actual data in the program area of a CD-R.

However, prior art devices using polarization sensitive optical heads have problems accurately reading $\beta$ due to birefringence within the disk substrate. Disk birefringence can be either molded into the substrate or created to a larger extent by exposing the substrate to different temperatures which can cause internal stresses. Other perturbations, such as physical stress can also induce a change in birefringence. Regardless of the source, the presence of birefringence in the write calibration area causes a change in $\beta$ value as read by the system. The incorrect $\beta$ value in turn causes an erroneous determination of ORP.

This phenomenon is attributed to a change in the optical frequency response which is mostly caused by a spatial filtering of the p- and s- polarization components in the aperture of the return beam. Therefore, in optical systems employing non-polarization sensitive optical heads this effect is, to a large extent, undetected. However, in recording optical systems, polarization sensitive heads offer the advantages of low laser feedback and high optical efficiency and in these optical systems the birefringence effect is more noticed.

FIG. 1 illustrates the effect of birefringence on $\beta$. In this case, the levels of birefringence are varied by modifying substrate molding conditions. The $\beta$ values versus recording power are similar for both cases of birefringence using a non-polarization sensitive head. However, a shift in $\beta$ values is observed when using a polarization sensitive optical head in the presence of a high amount of birefringence.

It should be understood from the foregoing discussion that there remains a need within the art for a technique that provides for compensating $\beta$ when using a polarization sensitive optical head in the presence of a high amount of birefringence.

SUMMARY OF THE INVENTION

The present invention provides a technique that compensates for the variation in $\beta$ due to a change in the optical frequency response (which is normally caused by a change in disk birefringence as explained above). The technique comprises the reading $\beta$ as a function of defocus (which here relates to the defocussing of the laser spot), calculating a figure of merit such as the slope $\beta$ verses defocus, and using a look-up table for proper $\beta$ compensation. A method and apparatus used in compensating for birefringence effects in measuring recording data quality on optical discs, $\beta$, in an optical disc reader/recorder comprising performing a power series of writes on the optical disc within the optical disc reader/recorder, wherein each member of the series has a merit parameter, $\beta$ value, identified and placed in a table versus recording parameters; identifying at least one particular track having an ideal merit parameters as compared to a predetermined value; using defocused optics to read the series of writes contained within the at least one particular track to generate a rate of change for $\beta$ vs. defocus setting for the particular track; determining a $\beta$ compensation value for the rate of change; and applying the $\beta$ compensation in conjunction with the table to select appropriate recording parameters.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has advantages in recording optical systems employing polarization sensitive heads that offer low laser feedback and high optical efficiency in that these optical systems can be designed with look up tables that dynamically alter $\beta$ compensation values on accordance with the birefringence of individual disc media.

BRIEF DESCRIPTION OF THE DRAWINGS

FIG. 2b shows the slope ($\Delta\beta/\Delta$Focus) of the fitted data shown in FIG. 2a.

To facilitate understanding, identical reference numerals have been used, where possible, to designate identical elements that are common to the figures.

DETAILED DESCRIPTION OF THE INVENTION

As noted above, $\beta$ measurement using a polarization-sensitive optical head is affected by the presence of birefringence. Accordingly, there is a risk of not selecting the appropriate recording power, known as ORP, as well as other recording parameters monitored during a write calibration operation. A compensation technique consisting of reading back $\beta$ as a function of defocus is proposed and described below.

The preferred embodiment envisions a calibration cycle in which data is recorded in the write calibration area of an optical disc, by recording several "tracks" within this area, each with increasing power levels. $\beta$ is then measured in a conventional manner typical within the art of optical disc recording. While recording in the calibration mode a table is created of $\beta$ versus the recording power used in recording as well as other recording parameters. The track that produces a β value comparable to the that of the target β value is identified along with its corresponding recording parameters. The target β value is set by the optical system is typically around 4%. It should be noted that interpolation techniques can be used if the target β value is identified as falling between two tracks.

Figure 1:
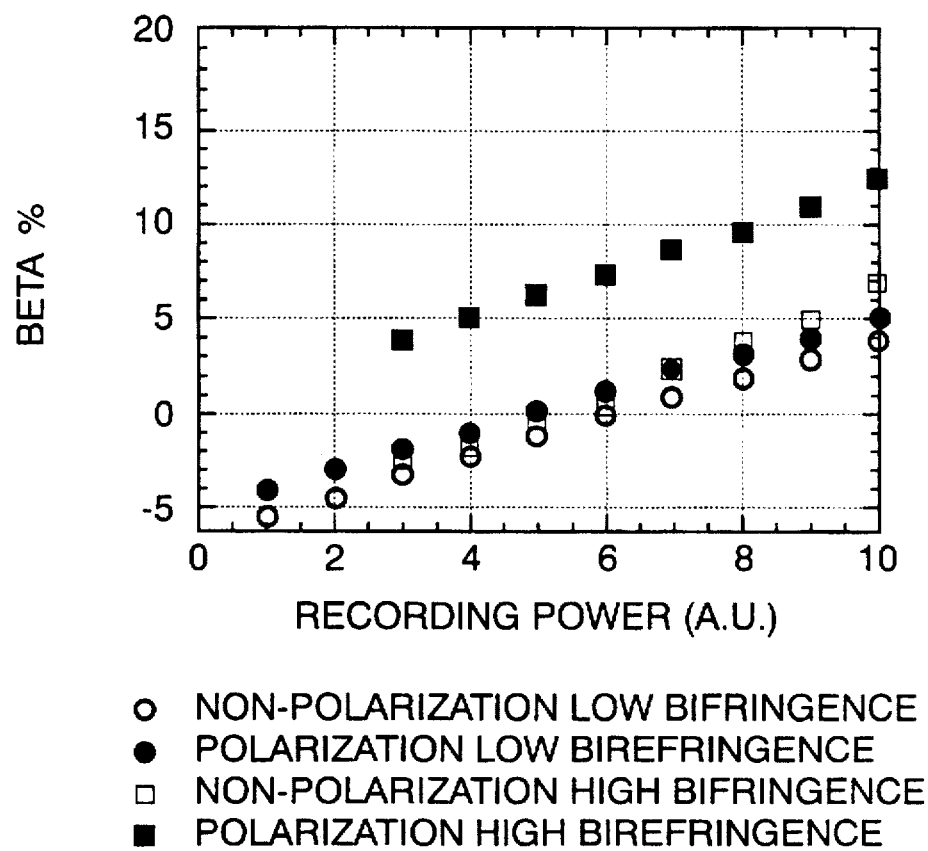
FIG. 1 shows $\beta$ as a function of recording power with different amount of birefringence using polarization and non-polarization sensitive heads.
Figure 2A:
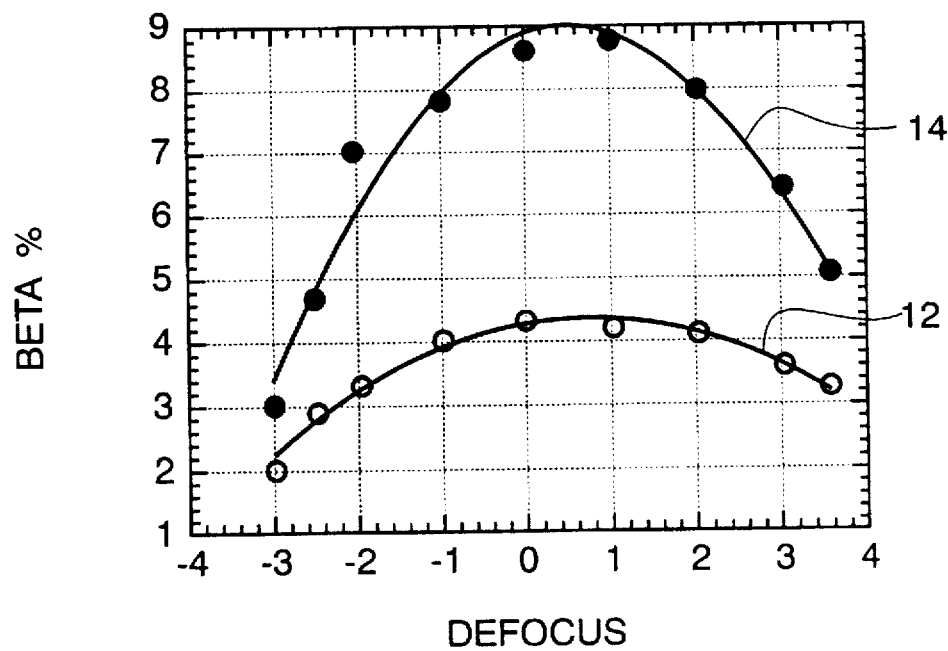
FIG. 2a shows $\beta$ as a function of defocus (steps of 0.5 um) with the disk at two different temperatures.

In order to identify the birefringence in the value of β, and the influence birefringence has on this value, β is read back on one, or several tracks, with different defocus settings. Here defocus refers specifically to defocussing the optics in discrete steps. Thus changing the size of the laser spot used in reading β. FIG. 2a is a graph that illustrates the behavior of β corresponding to one track as a function of defocus (in 0.5 um steps). One of the graphs illustrates the disk at Room Temperature, generally referred to as 12, and a graph of the same track on the disc heated up to an acceptable writer operating range, generally referred to as 14. As discussed earlier, heating the disk causes an increase in the level of birefringence. Note that, with the disk heated, β decays much faster as a function of defocus.

Figure 2B:
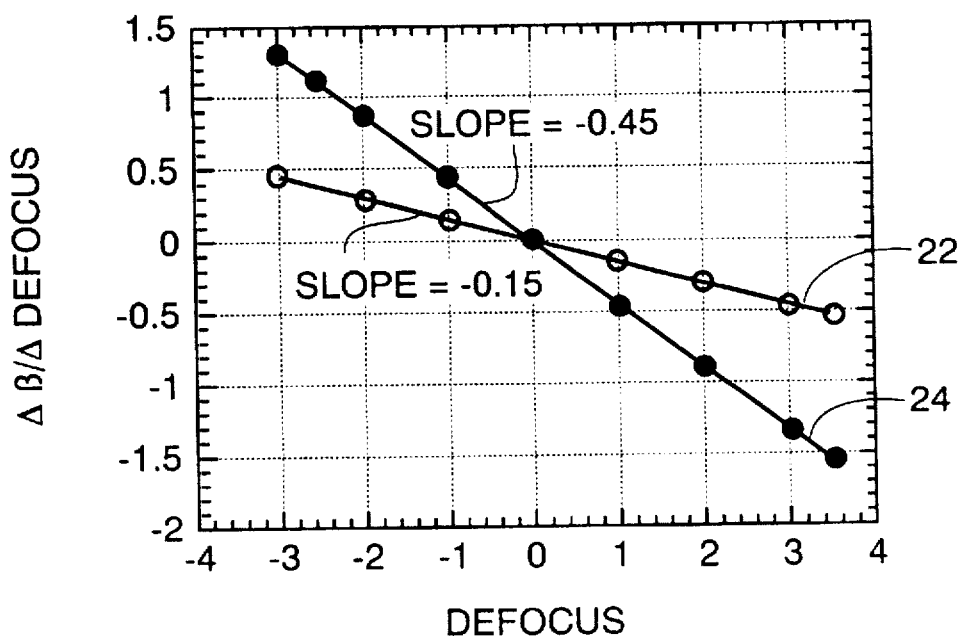

The data in FIG. 2a illustrate a fit for a second order polynomial. A figure of merit that is useful in quantifying the differences between the two cases shown in FIG. 2a is the slope (i.e. first order derivative) of the polynomial. FIG. 2b shows the slope (Δβ/Δdefocus) obtained by differentiating the second order polynomial in FIG. 2a with respect to defocus to obtain the linear representations shown as slope 22 which represents the rate of change of room temperature graph 12, and also slope 24 representing the rate of change of the hot graph 14 within FIG. 2a. It is clear that the heated case represented by slope 24 shows a factor of 3 increase in the slope of β versus defocus.

Therefore, the system as envisioned by the present invention comprises a polarization sensitive optical well known in the art, further employing the novel techniques that employs a defocus operation, calculates the slope (Δβ/Δdefocus) as described above and determines whether or not compensation is required. The look-up table comprises slope information versus β compensation values. In the example given above, a slope of −0.15 corresponds to no β adjustment whereas a slope of −0.45 corresponds to about a −5% β adjustment, or compensation. In areas where compensation is necessary, the recording parameters used in recording the disk are adjusted according to the slope of β versus power found during the initial operation. It should be understood by those skilled in the art that the look-up table might be particular to a given optical system and media type. The range of defocus and sign used in the defocus operation is determined according to the optical system, i.e. it is possible to use any number of positive and/or negative defocus positions as long as the chosen defocus value maximizes the sensitivity of β to defocus.

The invention has been described with reference to a preferred embodiment. However, it will be appreciated that variations and modifications can be effected by a person of ordinary skill in the art without departing from the scope of the invention.

Parts List:
12 room temperature graph
14 hot graph
22 slope
24 slope

I claim:

1. A method of compensating for birefringence effects in reading optical media comprising the steps of:

recording a segment of data on an optical disc and creating a table of having at least the parameters of β versus recording power used to create each write within the segment;

reading the segment by applying a defocused laser spot to the segment;

generating a rate of change for β and the defocused laser spot setting for the segment;

determining a β compensation value for the rate of change; and applying the β compensation in conjunction with the table to select appropriate recording parameters.

2. The method of claim 1 wherein the applying step further comprises applying the β compensation via a look up table for values of β for specific recording parameters.

3. The method of claim 1 wherein the step of reading further comprises reading data on the optical disc that has been determined to have acceptable β values by an optical recorder/reader in optimum conditions and is further accomplished at a hot write temperature.

4. A method of compensating for birefringence in measuring recording data quality on optical discs in an optical disc reader/recorder comprising the steps of:

performing a power series of writes on the optical disc within the optical disc reader/recorder, wherein each member of the series has a merit parameter, β value, identified and placed in a table versus recording parameters;

identifying at least one particular track having an ideal merit parameters as compared to a predetermined value;

using defocused optics to read the series of writes contained within the at least one particular track to generate a rate of change for β and defocus setting for the particular track;

determining a β compensation value for the rate of change; and applying the β compensation in conjunction with the table to select appropriate recording parameters.

5. The method of claim 4 wherein the step of applying further comprises placing β into essentially the ideal merit value.

6. The method of claim 4 wherein the step of determining further comprises determining rates of change for β within the particular track for a predetermined set of defocused values and for the ideal merit value and determining a scaling factor that can be applied for a given rate of change of β versus defocus values to arrive at essentially the ideal merit value.

7. The method of claim 6 wherein the scaling factor is determined by applying the table to defocused values obtained for identical data segments.

* * * * *